US006757412B1

(12) United States Patent
Parsons et al.

(10) Patent No.: US 6,757,412 B1
(45) Date of Patent: Jun. 29, 2004

(54) SYSTEM AND METHOD FOR HELPING TO DETERMINE THE CONDITION OF TISSUE

(75) Inventors: Mark David Parsons, Clifton, VA (US); Robert Mack Cothren, Walnut Creek, CA (US); John Scott Birbeck, Farmington, UT (US); Cliff Eugene Friefer, Farmington Hills, MI (US); David Cardon Rich, Park City, UT (US); Donald E. Waagen, Peoria, AZ (US)

(73) Assignee: Computerzied Thermal Imaging, Inc., Layton, UT (US)

( * ) Notice: Subject to any disclaimer, the term of this patent is extended or adjusted under 35 U.S.C. 154(b) by 0 days.

(21) Appl. No.: 09/425,042

(22) Filed: Oct. 19, 1999

Related U.S. Application Data

(60) Provisional application No. 60/105,147, filed on Oct. 21, 1998.

(51) Int. Cl.[7] ............................................. G06K 9/00
(52) U.S. Cl. .................... 382/128; 128/922; 250/316.1; 250/338.1; 356/51; 600/306; 600/310; 600/475; 374/10; 702/135
(58) Field of Search ................................. 382/125, 128, 382/115, 117, 118; 600/306, 473–475, 310; 378/141; 250/316.1, 338.1; 356/51, 71; 374/10, 121, 124; 348/77, 78, 161; 340/825.36, 825.14; 128/922; 377/25; 702/130–136

(56) References Cited

U.S. PATENT DOCUMENTS

| | | | |
|---|---|---|---|
| 3,960,138 A | | 6/1976 | Doss et al. |
| 4,135,497 A | * | 1/1979 | Meyers et al. .............. 600/549 |
| 4,186,748 A | | 2/1980 | Schlager |
| RE30,446 E | | 12/1980 | Meyers et al. |
| RE30,466 E | | 12/1980 | Meters et al. |
| 4,275,741 A | | 6/1981 | Edrich |
| 4,310,003 A | | 1/1982 | Schlager |
| 4,366,381 A | | 12/1982 | Fischer |
| 4,428,382 A | * | 1/1984 | Walsall et al. .............. 600/549 |
| 4,445,516 A | * | 5/1984 | Wollnik et al. ............. 600/549 |
| 4,524,779 A | | 6/1985 | Brown, Jr. |
| 4,624,264 A | | 11/1986 | Sagi |
| 4,651,749 A | | 3/1987 | Sagi |
| 4,819,658 A | | 4/1989 | Kolodner |
| 4,852,027 A | | 7/1989 | Bowman |
| 4,854,724 A | | 8/1989 | Adams |
| 5,056,525 A | * | 10/1991 | Hafezi ........................ 600/474 |
| 5,133,020 A | | 7/1992 | Giger |
| 5,260,871 A | | 11/1993 | Goldberg |
| 5,304,809 A | * | 4/1994 | Wickersheim ........... 250/458.1 |
| 5,509,084 A | | 4/1996 | Tanaka |

(List continued on next page.)

OTHER PUBLICATIONS

Bruce Waxman, Ph.D. Thermography for Breast Cancer Detection, *Health Technology Assessment Reports*, 1983, No. 22, pp. 1–24.

Istvan Nyirjesy, M.D. Breast Thermography, *Clinical Obstetrics and Gynecology*, Jun. 1982, vol. 25, No. 2, pp. 401–408.

Richard P. Chiacchierini. Biostatistics and the Analysis of Clinical Data, *Clinical Trials*, Jun. 1996.

(List continued on next page.)

*Primary Examiner*—Samir Ahmed
*Assistant Examiner*—Anand Bhatnagar
(74) *Attorney, Agent, or Firm*—Kunzler & Associates

(57) ABSTRACT

A system and method is disclosed for helping determine a condition of selected tissue of a patient based on a set of thermal images of the selected tissue acquired over a time period. The image set has image regions with corresponding characteristics indicative of a temperature condition of an associated part of the selected tissue, which had been subjected to a thermal challenge during part of the image acquisition time period. Feature values are determined based on the characteristics of selected image regions. A classifier is applied to the features to provide an indication of the condition of the selected tissue, such as indicating a likelihood of malignancy.

32 Claims, 9 Drawing Sheets

U.S. PATENT DOCUMENTS

| | | | | |
|---|---|---|---|---|
| 5,661,820 A | * | 8/1997 | Kegelmeyer, Jr. | 382/226 |
| 5,666,962 A | | 9/1997 | Lamey | |
| 5,810,010 A | * | 9/1998 | Anbar | 600/474 |
| 5,830,141 A | | 11/1998 | Makram-Ebeid | |
| 5,872,859 A | * | 2/1999 | Gur et al. | 382/128 |
| 5,941,832 A | | 8/1999 | Tumey | |
| 6,067,371 A | * | 5/2000 | Gouge et al. | 382/128 |
| 6,173,068 B1 | * | 1/2001 | Prokoski | 382/115 |

OTHER PUBLICATIONS

John K. Gohagan et al. Individual and Combined Effectiveness of Palpation, Thermography, and Mammography in Breast Cancer Screening, *Preventive Medicine,* 1980, vol. 9, pp. 713–721.

John R. Milbrath, M.D. Thermography, *Breast Cancer Detection,* 1987, pp. 145–152.

Harold J. Isard. Cancer in the "Cold" Breast Thermogram, *Am. J. Roentgenol,* 1976, vol. 127, pp. 793–796.

Marc S. Lapayowker, M.D. et al. Criteria for Obta and Interpreting Breast Thermograms, *Cancer,* 1976, vol. pp. 1931–1935.

Myron Moskowitz, M.D. et al. Lack of Efficacy of Thermography as a Screening Tool for Minimal and Stage I Breast Cancer, *The New England Journal of Medicine,* Jul. 29, 1976, vol. 295, No. 5, pp. 249–252.

Berkman Sahiner. Computer–Aided Classification of Malignant and Benign Lesions on Mammograms, Undated Abstract believed to be published by the University of Michigan.

M. Unser et al. Karhunen–Loeve Analysis of Dynamic Sequences of Thermographic Images for Early Breast Cancer Detection, Undated Publication, Brussels Belgium.

P. DeMuynck et al. Dynamic Thermography: Processing of Digital Image Sequences, Undated Publication, Brussels, Belgium.

Keinosuke Fukunaga. *Statistical Pattern Recognition,* Second Edition, 1990.

Jonathan F. Head et al. Breast Thermography is a Noninvasive Prognostic Procedure that Predicts Tumor Growth Rate in Breast Cancer Patients, *Annuals New York Academy of Sciences,* Nov. 30, 1993, vol. 698, pp. 153–158.

Robert L. Elliott et al. The Role of Thermography in the Diagnosis and Treatment of Breast Cancer, *EEE Meeting,* 1994.

Jonathan F. Head. Curriculum Vitae, Undated, pp. 1–7.

P. DeMuynck et al. Information Retrieval and Interpretation Sciences, *Metro Department: IRIS Research Project,* May 9, 1996, pp. 1–3.

Ernest E. Sterns, M.D. et al. Thermography, Its Relation to Pathologic Characteristics, Vascularity, Proliferation Rate, and Survival of Patients with Invasive Ductal Carcinoma of the Breast, *American Cancer Society,* Apr. 1, 1996, vol. 77, No. 7, pp. 1324–1328.

T. Oswald Siu, D.Sc. et al. Thermogram Aided Clinical Examination of the Breast—An Alternative to Mammography for Women 50 or Younger, *Candian Journal of Public Health,* Jul./Aug. 1982, vol. 73, pp. 232–235.

Judah Folkman. What is the Evidence That Tumors are Angiogenesis Dependent?, *Journal of the National Cancer Institute,* Undated.

Joanne R. Less et al. Microvascular Architecture in a Mammary Carcinoma: Branching Patterns and Vessel Dimensions, *Cancer Research,* Jan. 1, 1991, vol. 51, pp. 265–273.

Noel Weidner et al. Tumor Angiogenesis: A New Significant and Independent Prognostic Indicator in Early–Stage Breast Carcinoma, *Articles,* Undated.

Richard E. Bird, M.D. et al. Analysis of Cancers Missed at Screening Mammography, *Radiology,* 1992, vol. 184, pp. 613–617.

Stefano Ciatto, M.D. et al. Nonpalpable Lesions Detected with Mammography: Review of 512 Consecutive Cases[1], *Radiology,* 1987, vol. 165, pp. 99–102.

M. Moskowitz et al. Evaluation of New Imaging Procedures for Beast Cancer, *Recent Results in Cancer Research,* Undated, vol. 90, pp. 55–61.

Michel Gautherie. Thermopathology of Breast Cancer: Measurement and Analysis of In Vivo Temperature and Blood Flow, *Annals New York Academy of Sciences,* 1980, pp. 383–413.

Barbara Threatt et al. Thermography and Breast Cancer: An Analysis of a Blind Reading, *Annals New York Academy of Sciences,* Undated, pp. 501–517.

Harold J. Isard. General Discussion Thermography in the Mass Screening of Cancer, *Annals New York Academy of Sciences,* Undated, pp. 520–523.

Harold J. Isard. Thermography in Mass Screening of Cancer: Success and Failures, *Annals New York Academy of Sciences,* Undated, pp. 489–491.

Pietro M. Gullino. Influence of Blood Supply on Thermal Properties and Metabolism of Mammary Carcinomas, *Annals New York Academy of Sciences,* Undated, pp. 1–17.

John C. Chato. Measurement of Thermal Properties of Growing Tumors, *Annals New York Academy of Sciences,* undated, pp. 67–83.

Barbara Monsees, M.D. et al. Light Scanning Versus Mammography in Breast Cancer Detection[1], *Radiology,* 1987, vol. 163, pp. 463–465.

Noel Weidner, M.D. et al. Tumor Angiogenesis and Metastasis–Correlation in Invasive Breast Carcinoma, *The New England Journal of Medicine,* Jan. 3, 1991, vol. 324, No. 1, pp. 1–7.

William L Donegan. Diagnosis, Undated, Chapter 10, pp. 157–205.

Myron Moskowtiz. Breast Imaging, Undated, Chapter 11, pp. 206–239.

Pippa M. Simpson et al. Statistical Methods in Cancer Research, Undated, Chapter 41, pp. 822–843.

Resume of Dr. Lic. Patrick Demuynck, Undated.

* cited by examiner

SYSTEM AND METHOD FOR HELPING TO DETERMINE THE CONDITION OF TISSUE

REFERENCE TO RELATED APPLICATION

This application claims the benefit of U.S. Provisional Patent Application No. 60/105,147, which was filed Oct. 21, 1998.

TECHNICAL FIELD

The present invention relates to diagnosing tissue and, more particularly, to a system and method for helping to determine a condition of a patient's tissue, such as based on thermal images of the patient's tissue.

BACKGROUND OF THE INVENTION

Medical thermal imaging is a non-invasive diagnostic technique in which the skin surface temperature is mapped by detecting thermal radiation emitted by the skin surface. There are several clinical uses for thermal imaging. For example, thermal imaging is used to determine the extent of a previously diagnosed injury or condition, to detect an internal condition, such as cancer, or to monitor the healing process of a patient.

One particular use of thermal imaging relates to helping diagnose breast cancer. Cancerous areas have abnormal perfusion, which may result in warmer skin surface temperatures and abnormal response to heating and cooling on the skin surface adjacent or near the cancerous region. Such temperature characteristics may be detected by thermal imaging.

Unlike some other modalities of diagnosis, thermal imaging measures a physiological phenomenon which requires no contact with the body and no exposure to potentially harmful radiation. Conventional mammography, on the other hand, detects and/or measure structural or anatomical lesions through an application of radiation.

SUMMARY OF THE INVENTION

One aspect of the present invention provides a system for helping to determine a condition of selected tissue of a patient. The system includes memory which stores a plurality of images of the selected tissue acquired over a time period to define an image set. Each image of the image set includes a plurality of image regions. Each image region has a characteristic that is variable over the time period indicative of a temperature condition of an associated part of the selected tissue. The memory also stores a classifier derived from image sets of previously diagnosed tissue having a known tissue condition. The system also includes a processor operative to determine at least one feature value for at least one image region. The feature value is indicative of at least part of the characteristic of the image region over the time period. The processor is operative to apply the classifier to the at least one feature value to provide an indication of the condition of the part of the selected tissue of the patient associated with the at least one image region.

Another aspect of the present invention provides a system for helping to determine a condition of selected tissue of a patient. The system includes memory which stores thermal images of the selected tissue obtained over an image acquisition time period. The selected tissue has been exposed to a cooling challenge during a substantial part of the image acquisition time period. Each thermal image includes a plurality of image regions corresponding to an associated part of the selected tissue. Each image region has a characteristic that is variable over the image acquisition time period and indicative of a temperature condition of the associated part of the selected tissue. A processor is connected with the memory and is operative to determine at least one feature value for at least one image region over the image acquisition time period, which feature value is indicative of the characteristic of the respective image region over the image acquisition time period. The processor provides an indication of the condition of the part of the selected tissue associated with the at least one image region upon applying a predetermined classifier to the feature value.

Yet another aspect of the present invention provides a method for helping determine a condition of selected tissue of a patient. The method includes acquiring an image set of the selected tissue over an image acquisition time period. The image set includes a plurality of image regions, each image region having a characteristic that is variable over the image acquisition time period. The characteristic also is indicative of a temperature condition of an associated part of the selected tissue. A thermal challenge is applied to the selected tissue during part of the image acquisition time period. The characteristic of at least one image region is modeled to quantify a plurality of features for each characteristic being modeled. Each feature has a value functionally related to the characteristic being modeled. At least one feature is selected for the image region. A classifier is applied to the selected feature to provide an indication of the condition of the part of the selected tissue associated with the image region.

Still another aspect of the present invention provides a method for developing image data for use in helping determine a condition of selected tissue of a patient. The method includes providing thermal image data for a plurality of image sets. Each of the plurality of image sets is obtained over an image acquisition time period for selected tissue. An image region is selected for each of the plurality of image sets, which image region corresponds to a part of the selected tissue having a predetermined tissue condition. Each selected image region has a characteristic that is variable over the image acquisition time period for the corresponding image set. Each characteristic also is indicative of a temperature condition for the part of the selected tissue of the corresponding image set. A plurality of features are determined for each selected image region. Each feature has a value indicative of the characteristic of a respective one of the selected image regions. At least one feature is selected for each selected image region having a common predetermined tissue condition. A classifier is developed to describe a statistical distribution based on the values of each selected feature.

BRIEF DESCRIPTION OF THE DRAWINGS

The foregoing and other features and advantages of the present invention will become more apparent to one skilled in the art upon consideration of the following description of a preferred embodiment of the present invention and the accompanying drawings in which.

DESCRIPTION OF A PREFERRED EMBODIMENT

Figure 1:
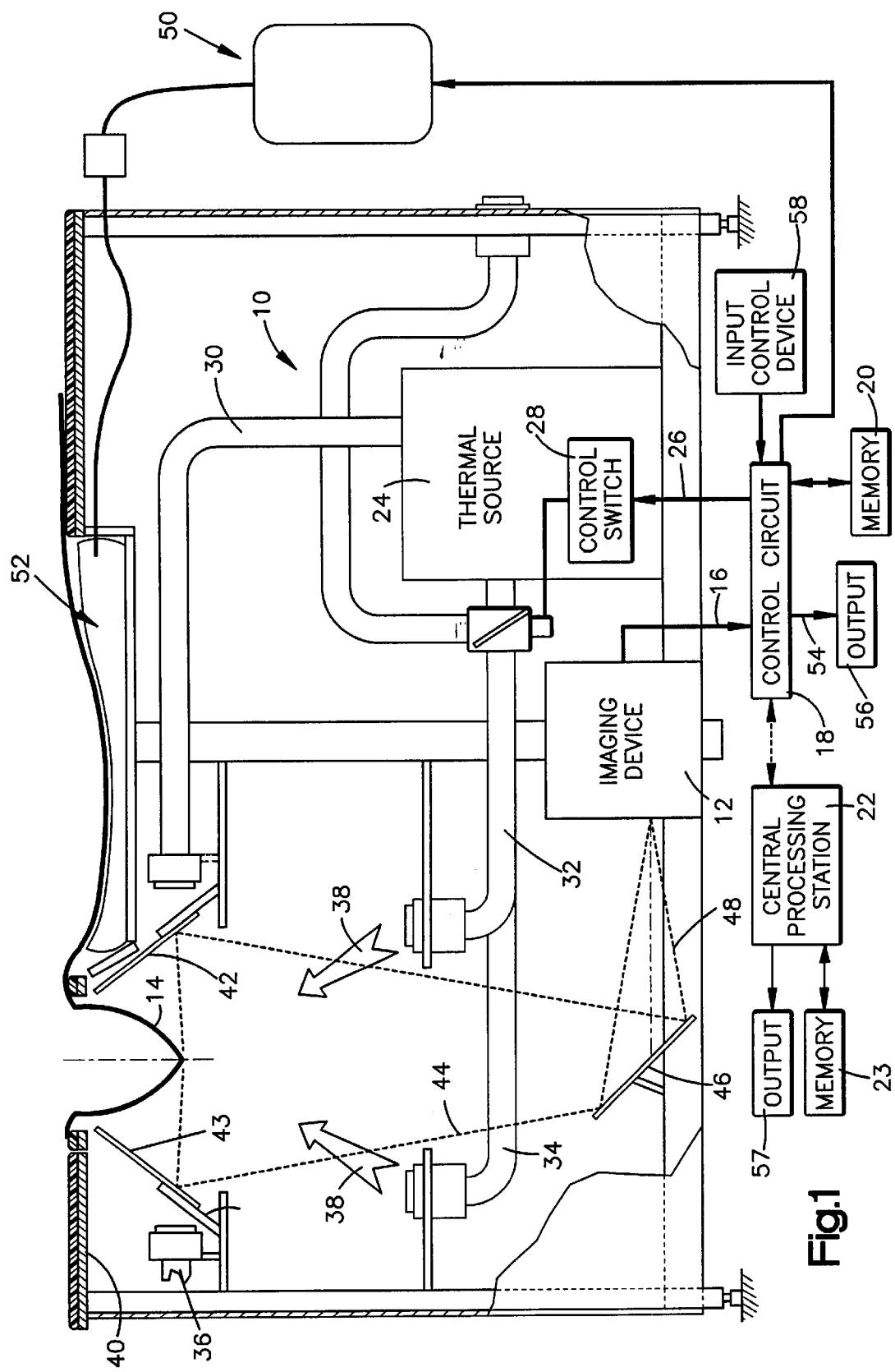
FIG. 1 is a schematic representation of a system in accordance with a preferred embodiment of the present invention.

FIG. 1 illustrates a thermal imaging system 10 in accordance with a preferred embodiment of the present invention. The system 10 includes a thermal sensor, such as a thermal imaging device 12. The thermal imaging device 12 is operative to measure an amount of thermal radiation emitted from an object, such as the skin surface of a patient's breast 14. Preferably, the thermal imaging device 12 detects thermal radiation emitted from the skin in the infrared wavelength range.

The thermal imaging device 12 preferably is a digital infrared camera. Alternatively, an analog infrared camera may be used in combination with an appropriate analog-to-digital converter. Because such cameras are well known in the art, details of their specific structure and operation will not be described herein. It will be apparent to those skilled in the art that various aspects of the control processes described below should be tailored according to the particular imaging device being used.

The thermal imaging device 12 is connected to a control circuit 18 for providing an image signal 16. The image signal 16 has an electrical characteristic indicative of the thermal radiation emitted from the breast 14. The control circuit 18 is electrically connected to memory 20 for storing image data received from the thermal imaging device 12. The memory 20, which may include one or more storage device, may be part of the control circuit 18, such as an internal memory card or chip. Alternatively, the memory 20 may be located external to the control circuit 18. The memory 20 may be capable of storing a plurality of image sets for different tissue samples.

The control circuit 18 preferably includes one or more microprocessors for controlling operation of the system 10. The control circuit 18 may, for example, be a main frame computer, a personal computer, an integrated circuit, a plurality of discrete components and/or a combination of discrete components and integrated circuits. The control circuit 18 is configured to control the imaging process, including storing each of the acquired images in the memory 20. The control circuit 18 also may be configured to perform selected analysis of the stored image data, in accordance with the present invention.

The system 10 also may include a central processing station 22 which is operative to receive data from and transmit data to the control circuit 18. The data communication between the control circuit 18 and central processing station 22 may occur by any means of data communication. The central processing station 22 may, for example, be located at the same or a different facility from where the image sensor 12 and control circuit 18 are located.

The central processing station 22 includes memory 23, which may be substantially identical to memory 20 described above. The memory 23 stores the program data for controlling operation of the central processing station 22, as well as stores the image data received from the control circuit 18.

In the system shown in FIG. 1, the control circuit 18 also is electrically connected with means for providing an external stress to a selected area of tissue, such as the breast 14. In particular, such means is a source of thermal energy 24 that is operative to provides a thermal challenge onto the breast. The thermal challenge may include a heated or cooling fluid, such as air. Preferably, the source 24 provides a cooling challenge of air onto the patient's breast 14 that is being imaged.

By way of example, the control circuit 18 provides a control signal 26 to a control switch 28 of the thermal source 24 to control the flow of cooling air. A plurality of conduits 30, 32, 34, and 36 extend from the source of cooling air 24 to locations adjacent to where the breast 14 is positioned. The conduits 32 and 34 provide cooling air, indicated at arrows 38, uniformly onto the breast 14. The conduits 30 and 36 operate to return air to the thermal source 24. The conduits 32 and 34 also may be adjustable to ensure uniform cooling of the breast 14. Preferably, the thermal source 24 provides a cooling challenge of air up to about 15° F. below ambient temperature to cool the skin surface of the breast 14.

A preferred embodiment of a functional thermal imaging apparatus is described in co-pending U.S. application Ser. No. 08/864,752, which is incorporated herein by reference. The functional thermal imaging apparatus includes a table 40. The patient lies prone the table 40, with the patient's breast 14 extending through a corresponding aperture formed through the table 40. As the surface of the breast is cooled by the chilled air 38, a plurality of mirrors 42, 43 reflect thermal radiation from the breast 14, indicated at 44, from the breast to a lower mirror 46. A central portion of the infrared image is obtained from thermal radiation going directly from the breast 14 to the lower mirror 46. The lower mirror 46, in turn, reflects the thermal radiation, indicated at 48, to the thermal imaging device 12 that describes an infrared image of the entire breast 14. As stated above, the imaging device 12 provides an image signal 16 to the control circuit 18 which, in turn, stores the image signal as an image set formed of a series of consecutive image frames.

Each of the image frames is formed of one or more image region, which may be formed of one or more image pixels. It is desirable that each image region in each consecutive image frame corresponds to substantially the same spatial region of the breast 14. The above-incorporated patent application provides a preferred example of a functional thermal imaging apparatus. Other thermal imaging systems and methods also could be used to obtain image data for use in accordance with the present invention.

Referring back to FIG. 1, movement of the breast 14 is minimized, for example, by an inflator system 50. The inflator system 50 is electrically connected to the control circuit 18. The inflator system 50 controls inflation and deflation of an associated inflatable cushion 52, such as based on a control signal from the control circuit 18.

Alternatively, the inflator system 50 may include internal controls for controlling inflation and deflation of the cushion 52. The inflatable cushion 52 is inflated and deflated to counteract movement of the breast 14 as the patient breathes. This enables the thermal imaging device 12 to acquire good registration between successive thermal images of the breast 14.

The control circuit 18 also may provide a signal 54 to an output 56. The output 56 may be a conventional video display device. Alternatively, or in addition to a video display device, the output 56 may include a printer or other device capable of displaying a representation of the acquired image data and/or results of analysis for such image data. The output 56 further may include a data storage device or an interface connected to a network bus to which the control circuit 18 may provide stored image data and/or the results of the analysis. As stated above, the analysis may, in accordance with the present invention, be performed at the control circuit 18 or at the central processing station 22. Consequently, it is desirable that the central processing station 22 also include similar output options, indicated at 57.

The control circuit 18 also is connected to an input control device 58. The input control device 58 may be a conventional computer keyboard, a voice recognition input device, or any suitable input device for inputting control instructions to the control circuit 18.

In view of the thermal imaging system 10 described above, each pixel of each image frame acquired by the thermal imaging device 12 has spatial and temporal parameters corresponding to a particular spatial region of the breast 14 at a given instant in time. Each respective pixel has a pixel value indicative of a thermal condition of essentially the same spatial region of the breast 14 in each of the consecutive image frames. The pixel values for each spatial region of the breast are stored in the memory 20 as part of the image data.

It will be appreciated by those skilled in the art that the term pixel, as used herein, may correspond to a single picture element or a plurality of such picture elements grouped together for the purpose of analyzing a selected region of tissue.

The foregoing structure is capable of performing several processes. To facilitate explanation of such processes, and not by way of limitation, the individual processes are organized under descriptive headings. Briefly stated, the processes include an image acquisition process through which desired image data may be obtained. The analysis of image data is subdivided into two processes, which are described under subheadings of the image analysis section. One such process relates to developing a classifier and the other relates to applying a classifier to image data for tissue having an unknown condition.

A. Image Acquisition Process

Figure 2:
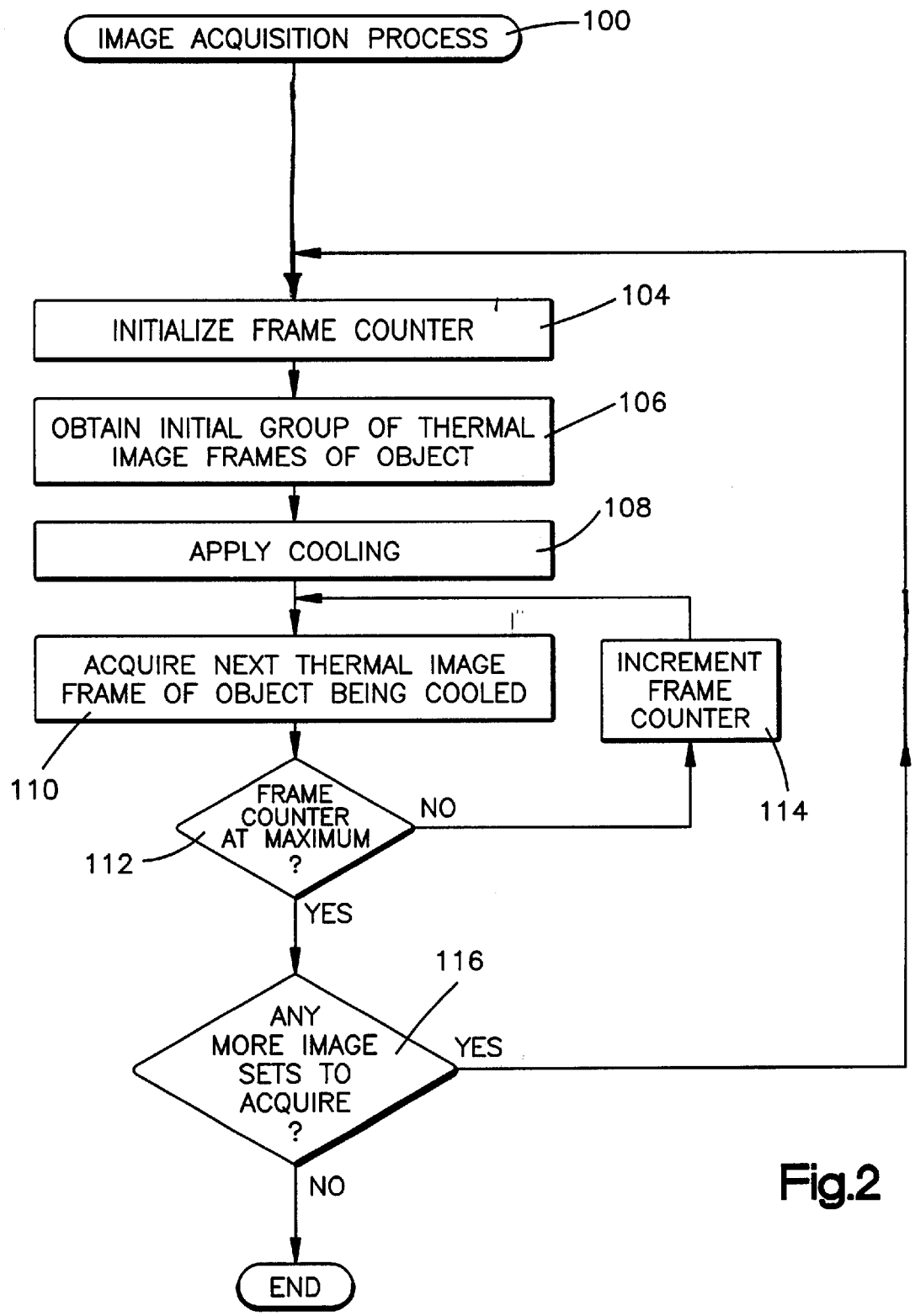
FIG. 2 is flow diagram of an image acquisition process.

A process for acquiring one or more image sets, for use in the system and method of present invention, will be better appreciated with reference to FIG. 2. Each image set is acquired over an image acquisition time period that includes both a time interval before and during application of the thermal challenge, such as from the thermal energy source 24.

Referring to FIG. 2, the image acquisition process begins at step 100 with the control circuit 18 initializing internal parameters, such as clearing all buffers and setting flag conditions to their initial values. It is to be understood and appreciated that, in the case of multiple image sets, each image set may be acquired at different times and/or at different facilities.

The process proceeds to step 104 in which a frame counter or timer is initialized. The frame counter enables the control circuit 18 to obtain a desired number of image frames. For example, about 100 frame may be acquired for each image set, although any desired number of image frames could be used. The process proceeds to step 106.

At step 106, an initial group of digital thermal image frames of a breast are obtained (e.g., 14 of FIG. 1). The initial group of image frames in each image set provides a baseline equilibrium measurement of the thermal characteristics of the patient's breast tissue prior to application the thermal challenge. The baseline group of image frames may, for example, include about ten to twenty percent of the total number of image frames in the image set.

From step 106, the process proceeds to step 108 in which a thermal challenge is applied to the surface of the tissue sample being imaged. As shown in FIG. 1, for example, the control circuit 18 activates the source of cooling air 24 to initiate the cooling challenge. The activation may be automatic, such as a function of the frame counter value, or it may be manually initiated by the technician or other clinician administering the process.

Referring back to FIG. 2, the process next proceeds to step 110 in which an image frame is acquired during the application of the thermal challenge. For example, the thermal imaging device 12 provides the thermal image signal 16 to the control circuit 18 of the tissue 14 being cooled. The control circuit 18, in turn, acquires or stores the image data for that frame in memory 20. The control circuit 18 also controls the rate at which images are acquired. Preferably, the image frames are acquired at a predetermined rate, such as about one frame every one to two seconds. The process then proceeds to step 112.

At step 112, a determination is made whether the desired number of image frames have been obtained, such as indicated by the frame counter. If the determination is negative, indicating that the desired number of frames has not been acquired, the process proceeds to step 114 in which the frame counter is incremented. The process then returns to step 110 and another image frame of the tissue is obtained and stored in memory 20.

If the determination at step 112 is affirmative, indicating that the desired number of image frames have been acquired for the current image set, the process proceeds to step 116. At step 116, a determination is made whether any additional image sets are to be acquired or stored. This determination may represent part of a computerized process or a conscious step by a technician.

As described in greater detail below, an image set may be acquired for different purposes. For example, numerous image sets for tissue having a known pathology are used to help develop a classifier in accordance with the present invention. The acquisition of image sets for developing a classifier typically occurs over an extended period of time, such as weeks or even years. Alternatively, one or more image sets may be acquired for a given patient to, in accordance with the present invention, help diagnose the pathology of a suspicious lesion or other region of tissue.

Referring back to FIG. 2, if the determination at step 116 is affirmative, indicating that another image set is to be acquired, the. process returns to step 104 and an image set for the next patient or a different area of tissue for the same patient is acquired according to steps 104–114. If the determination at step 116 is negative, indicating that no additional image sets are to be acquired, the image acquisition process ends.

It will be appreciated that, the image acquisition process may resume at step 118 at any given time to acquire another image set. Similarly, the process also may begin anew at step 100 to acquire an image set for a selected patient. The image data for each image set is stored in appropriate memory (e.g., 20 or 23 of FIG. 1) for processing in accordance with the present invention.

Figure 3:
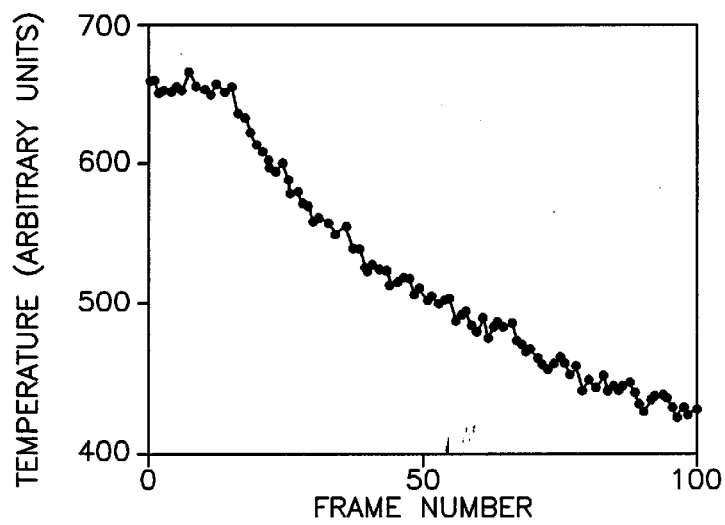
FIG. 3 is a graphical representation of image data, illustrating a first characteristic for a particular location in an image set.

FIG. 3 illustrates a typical temporal response of a pixel for about 100 image frames of image data. The pixel has a temperature characteristic or profile indicative of the temperature condition for an associated spatial region of the patient's tissue during the image acquisition time period. Approximately the first twenty frames were obtained prior to applying of the thermal challenge (e.g., step 108 of FIG. 2). The remaining pixel values are from subsequent image frames, which illustrate a cooling response for the corresponding spatial region of tissue.

B. Analysis of Image Data

After the image profile has been acquired, the image data is analyzed. One aspect of image analysis relates to developing a classifier based on the image data selected from many image sets for previously diagnosed tissue regions having a known pathology. The image sets typically are acquired from numerous patients, such as obtained in accordance with the image acquisition process of FIG. 2. The image data also may include several image sets for the same patients acquired at different times.

The classifier, once properly developed, may be used in another aspect of image analysis, namely, to help diagnose tissue having an unknown condition through application of the classifier. Both aspects of image analysis include processing stored image data. Preferably, the analysis is performed by a sufficiently powerful computer, which may be located locally where the image data is acquired (e.g., by the control circuit 18 of FIG. 1) or remotely (e.g., at the central processing station 22 of FIG. 1). The classifier development process and the process for applying a classifier are described below.

(i) Classifier Development Process

Figure 4A:
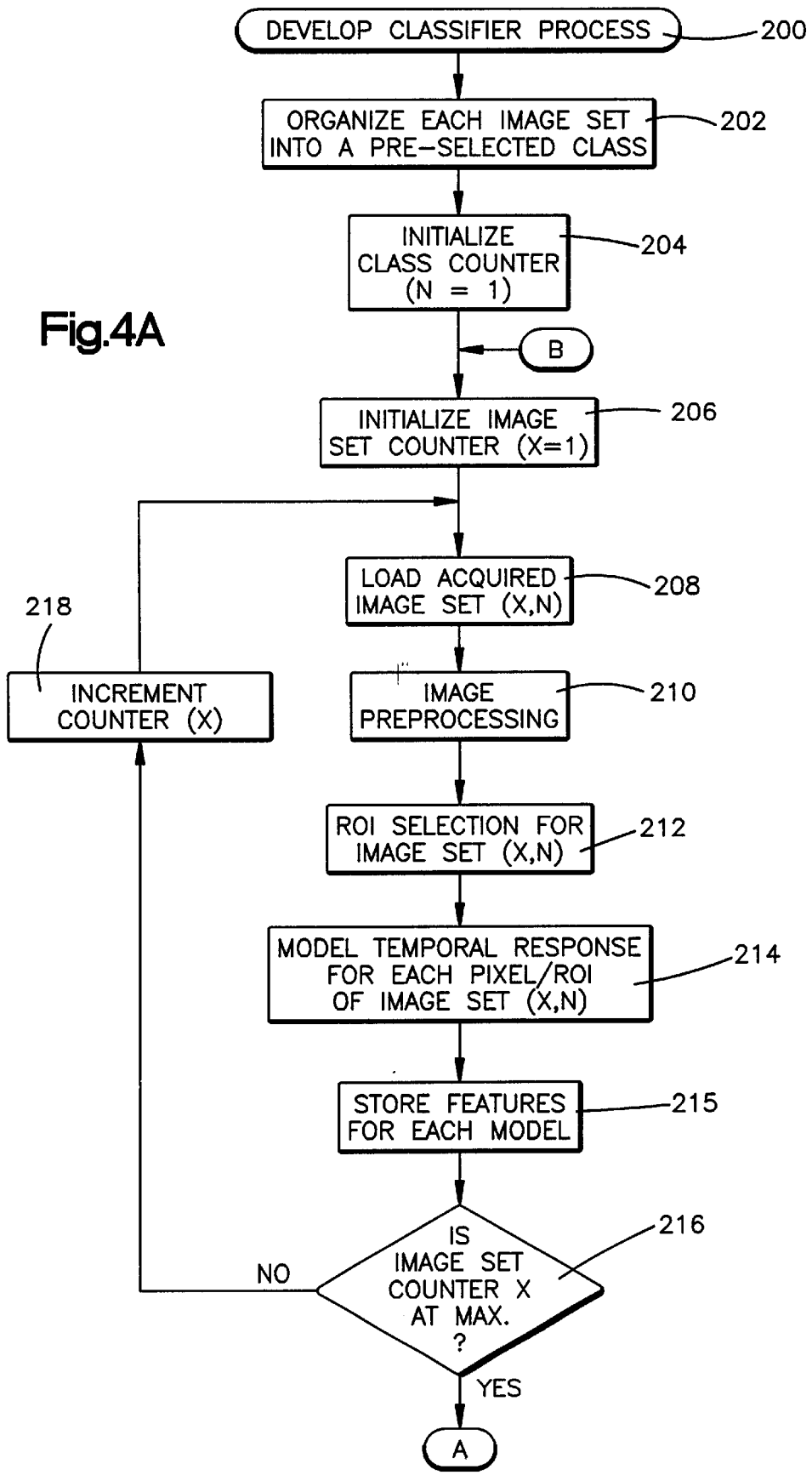
FIGS. 4A and 4B collectively are a flow diagram for a process of developing a classifier in accordance with a preferred embodiment of the present invention.
Figure 4B:
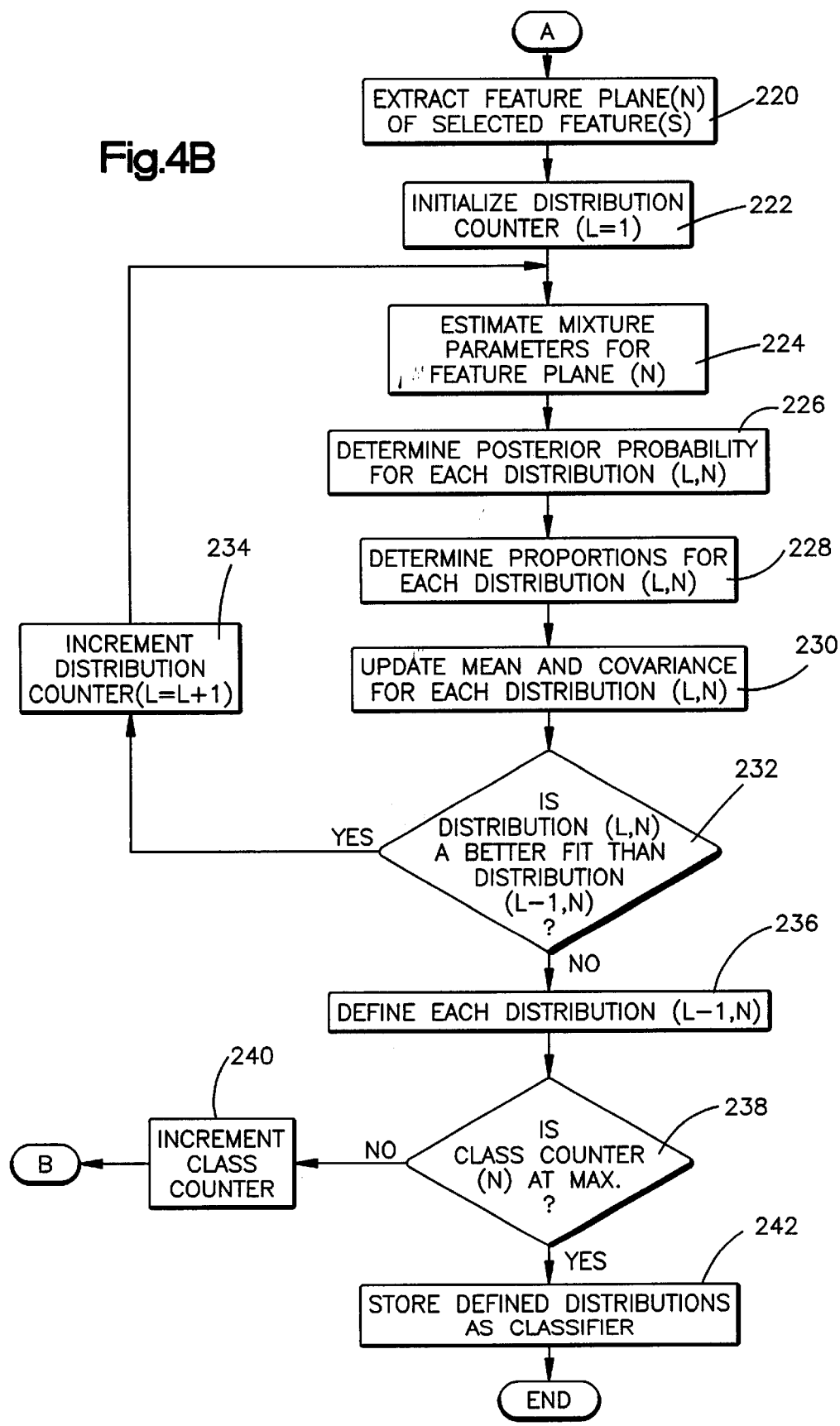

The process of developing the classifier will be better appreciated with reference to FIGS. 4A and 4B. In general, a particular classifier is determined, or designed, based on a statistical analysis of selected feature values determined from the image sets of previously diagnosed tissue samples of known pathology. Each classifier is designed to correspond to a selected feature or a selected combination of features. Accordingly, several classifiers may be derived for use in analyzing different respective features determined for an image set of a patient's tissue having an unknown condition.

Referring to FIG. 4A, the process for developing a classifier begins at step 200 in which selected parameters are initialized and flag conditions are set to appropriate initial values. The process proceeds to step 202. At step 202, each image set of the image data is organized into a preselected class. Each class corresponds to a differently diagnosed tissue condition. In particular, a spatial region of tissue in each image set has been previously diagnosed to belong to a known class having a predetermined tissue condition. Such diagnosis may be based on, for example, pathology results (e.g., biopsy). Alternatively, a mammogram, an ultrasound, a clinical examination, or other diagnostic modalities may be used to determine the appropriate tissue class. The classes include, for example, malignant and benign. Of course, other classes or subclasses also may be used in accordance with the present invention. For purposes of brevity, however, this process will be described with respect to two classes, malignant and benign.

Referring back to FIG. 4A, the process continues to step 204 in which a class counter, indicated at N, is initialized. The class counter is used to keep track of which class of image data is being processed. The process proceeds to step 206. At step 206, an image set counter, indicated at X, is initialized. The image set counter indicates which image set of the current class is being evaluated.

The process proceeds to step 208 in which a first acquired image set X of the current class is loaded into active memory. The process then proceeds to step 210 in which appropriate image pre-processing of the loaded image set is performed. Such pre-processing may include, for example, applying selected temporal and/or spatial filters to the image data. The process proceeds to step 212.

At step 212, a region of interest (ROI) is selected for the current image set of the current class. The ROI selection for the image set may be based on any reliable localization technique. Such techniques include, for example, mammogram, ultrasound imaging, or clinical examination. The ROI includes the part of the tissue that has been previously diagnosed to belong to the current class (e.g., malignant or benign). The ROI may be rectangular, such as about the size of a standard breast quadrant, although other shapes and dimensions may be used.

From step 212, the process proceeds to step 214 in which a temporal response for each pixel or a selected subregion of the ROI for the current image set is modeled. Each pixel in the ROI may be modeled individually. Alternatively, a region consisting of several pixels within the subregion may be modeled, such as by taking the average or mean value of all pixels in the selected subregion of each image frame.

One or more pre-selected models are used to quantify both temporal and spatial characteristics of the selected ROI in the image set. The temporal response for each pixel in the image data is modeled to provide quantitative features or parameters indicative of thermal characteristics of each pixel over the data acquisition time period. The features are extracted from the model for each temporal response of each pixel. The features describe how the temperature at an associated spatial region of the selected tissue sample varies as a function of time during the image acquisition time period.

Various models may be used to define the thermal characteristics of each pixel over the image acquisition time period. Before continuing with the description of the classifier development process of FIGS. 4A and 4B, examples of some possible models will be described.

One temperature model for the detected temperature characteristic is based on a double-exponential decay of the form:

$$T = T_0 + T_1(1 - e^{\alpha_1 t}) + T_2(1 e^{\alpha_2 t}) \tag{Eq. 1}$$

where:

$T_0$ = initial temperature data before initiation of thermal challenge(° C.);

$T_1$ = magnitude of cooling due to a first mechanism during application of cooling challenge(° C.);

$\alpha_1$ = rate of cooling due to the first mechanism during application of cooling challenge (1/seconds);

t = time;

$T_2$ = magnitude of cooling due to a second mechanism during application of cooling challenge (° C.); and $\alpha_2$ = rate of cooling due to the second mechanism during application of cooling challenge (1/seconds).

The model of Eq. 1 represents the cooling profile of body tissue, such as the skin surface of a patient's breast, where each exponential term indicates cooling due to one of two mechanisms. The $T_0$ value corresponds to the average temperature data in the image frames prior to initiating the thermal challenge. The $T_1$ and $\alpha_1$ coefficients correspond to short term temperature responses of the first mechanism. The $T_2$ and $\alpha_2$ coefficients correspond to long term temperature responses of the second mechanism.

The double exponential of Eq. 1 may be simplified by approximating the second exponential by the first term in its series expansion. Accordingly, the cooling model of Eq. 1 may be reduced to:

$$T = T_0 - \delta(1 - e^{\alpha t}) - \beta t \qquad (Eq.\ 2)$$

where:

$T_0$=initial temperature before initiation of thermal challenge (° C.);

δ=magnitude of rapid cooling component during thermal challenge (° C.);

∝=rate of rapid cooling component during thermal challenge (1/seconds); and

β=rate of slow cooling component during thermal challenge (° C./seconds).

Features of each cooling response for the model of Eq. 2 may be determined using least-squares regression applied directly to each pixel of the temperature data. The regular features thus include the coefficients $$(T_0,\ \delta,\ \propto,\ \text{and } \beta)\ of \qquad Eq.\ 2.$$

The pre-cooling data, which includes about the first 10–20 frames prior to the cooling challenge can be described using a simple linear model. The linear model may be analyzed using linear regression. This results in two additional features for each pixel, namely, a slope and an intercept. The slope corresponds to the rate of the temperature change during the time before initiation of the thermal challenge and the intercept corresponds to the initial temperature when the test was initiated. The slope and the intercept in combination with $T_0$, ∝, α and β comprise six possible features that may be used for analyzing the temporal response of each pixel.

Another model, which may be used to produce quantified features for the cooling response, is a differential model. The features of this model may be determined by computing differential temperature data. The differential temperature data may be calculated by subtracting from the temperature value of each pixel the mean temperature for all pixels in the same frame (i.e., at the same instant in time). The differential features may be obtained by applying least-squares regression to the differential temperature data.

Figure 5:
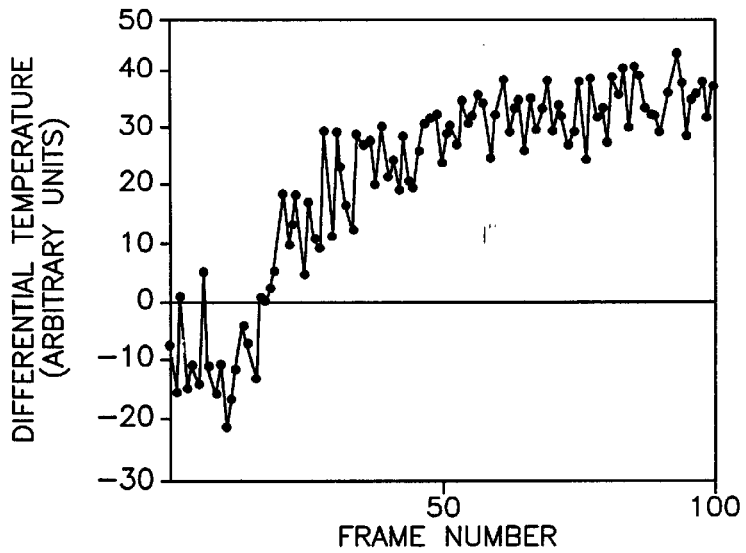
FIG. 5 is a graphical representation of image data, similar to FIG. 3, illustrating a second characteristic for the particular location in the image set.

A differential response for a single pixel is shown in FIG. 5. Similar to the regular features, the differential model produces six features, which include:

$T_{0d}$=initial temperature before initiation of thermal challenge (° C.);

$\delta_d$=magnitude of rapid cooling component during thermal challenge(° C.);

$\propto_d$=rate of rapid cooling component during thermal challenge (1/seconds);

$\beta_d$=rate of slow cooling component during thermal challenge (° C./seconds);

$intercept_d$=the initial differential temperature when the test is initiated (° C.); and $slope_d$=the rate of differential temperature change before initiation of the thermal challenge (° C./seconds).

Another model which may be used to provide features indicative of the temperature characteristics of each pixel is a simple differential model. This approach does not require non-linear regression, as do the regular and differential models. The simple differential features are local averages of the differential temperature at three selected points in the time during application of the thermal challenge.

Figure 6:
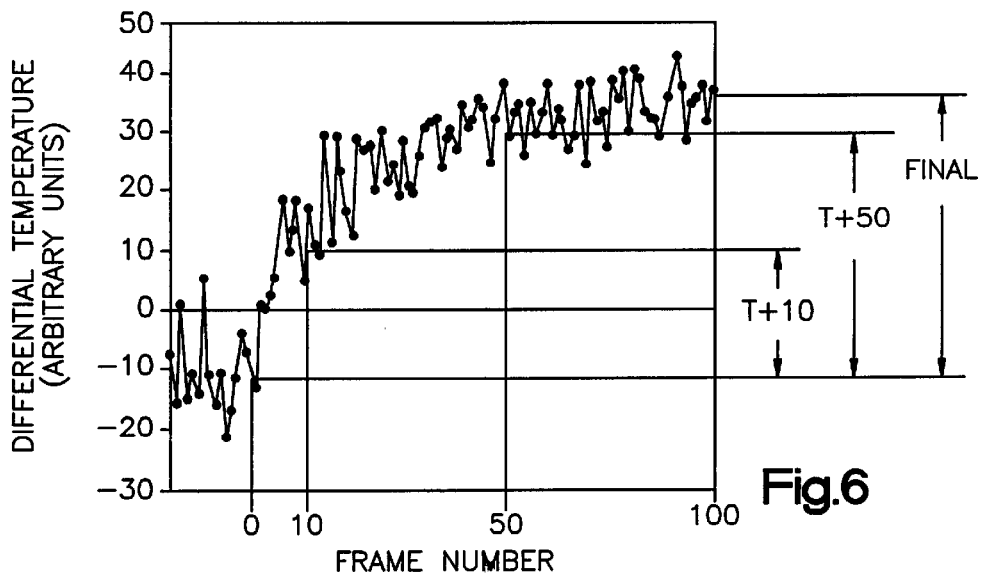
FIG. 6 is a graphical representation of image data corresponding to an annotated version of the image data shown in FIG. 5.

For example, a differential feature may include: T+10, which corresponds to the average differential temperature 10 frames after cooling was initiated (e.g., about 20 seconds); T+50, which corresponds to the average differential temperature 50 frames after cooling was initiated (e.g., about 100 seconds); and final, which corresponds to the average differential temperature at the end of the image acquisition time period. FIG. 6 illustrates the same response as illustrated in FIG. 5, but with simple differential features being indicated.

Each of the 15 features for the above-described models may be determined from the temporal response of each pixel. Individual features may be selected and combined into groups of one or more features to provide a plurality of possible feature combinations.

In certain circumstances, certain differential features may provide better results than regular features. This is because the differential features provide a greater level of independence from patient-to-patient variations in the cooling response than the regular features. In addition, the differential features may be less affected by variations in the accuracy of the thermal imaging device 12 than the regular features.

The initial temperature value ($T_0$, $T_{0d}$) and the magnitude of the cooling response ($\delta$, $\delta_d$ and $\beta$, $\beta_d$) are useful for determining a likelihood of malignancy. The features selected for analysis, therefore, preferably include at least the initial temperature ($T_0$; $T_{0d}$) and/or a measure of the cooling magnitude ($\delta$, $\delta_d$; $\beta$, $\beta_d$). Of course, other models may be used to develop different features that describes the thermal condition of the selected tissue regions.

Referring back to FIG. 4A, after the temporal response for the image set has been modeled (step 214), the proceeds to step 215. At step 215, the feature values that have been derived for each pixel or a selected subregion within the ROI are stored. The process continues to step 216.

At step 216, a determination is made whether the image set counter is at its maximum value. If the determination is negative, indicating that additional image sets remain to be processed, the process proceeds to step 218. At step 218, the image set counter is incremented. From step 218, the process returns to step 208 in which the next image set for the current class is loaded into active memory for processing according to steps 210–215.

In the event that the determination at step 216 is affirmative, indicating that the image set counter has reached its maximum value, the process proceeds through connector A to step 220, shown in FIG. 4B. This occurs after all image sets of the current class have been modeled and selected feature values have been stored. At step 220, a feature plane for the current class is extracted from the stored feature data. A feature plane includes one or more feature values selected from each model for each image set of the current class. A simple feature plane includes, for example, a value of a single feature extracted from a model of each temporal response. Typically, several feature values are selected from the model(s) of each temporal response.

The process proceeds to step 222 in which a distribution counter, indicated at L, is initialized. The distribution counter identifies the number of statistical distributions or kernels used to define the feature values selected from each temporal response of the current class of image data.

In accordance with a preferred embodiment, an expectation maximization technique is used to generate a description of likelihood distributions for each class N (e.g., malignant or benign). The distributions are derived from the features selected from the image sets in each class of known pathology. This and other suitable statistical pattern recognition techniques are described in a publication entitled "Statistical Pattern Recognition," second edition, authored by Keinosuke Fukunaga, published by Academic Press (1990).

From step 222, the process proceeds to step 224 in which initial mixture parameters are estimated for the feature plane. Such estimation may be performed, for example, by any known statistical clustering algorithm.

Figure 7:
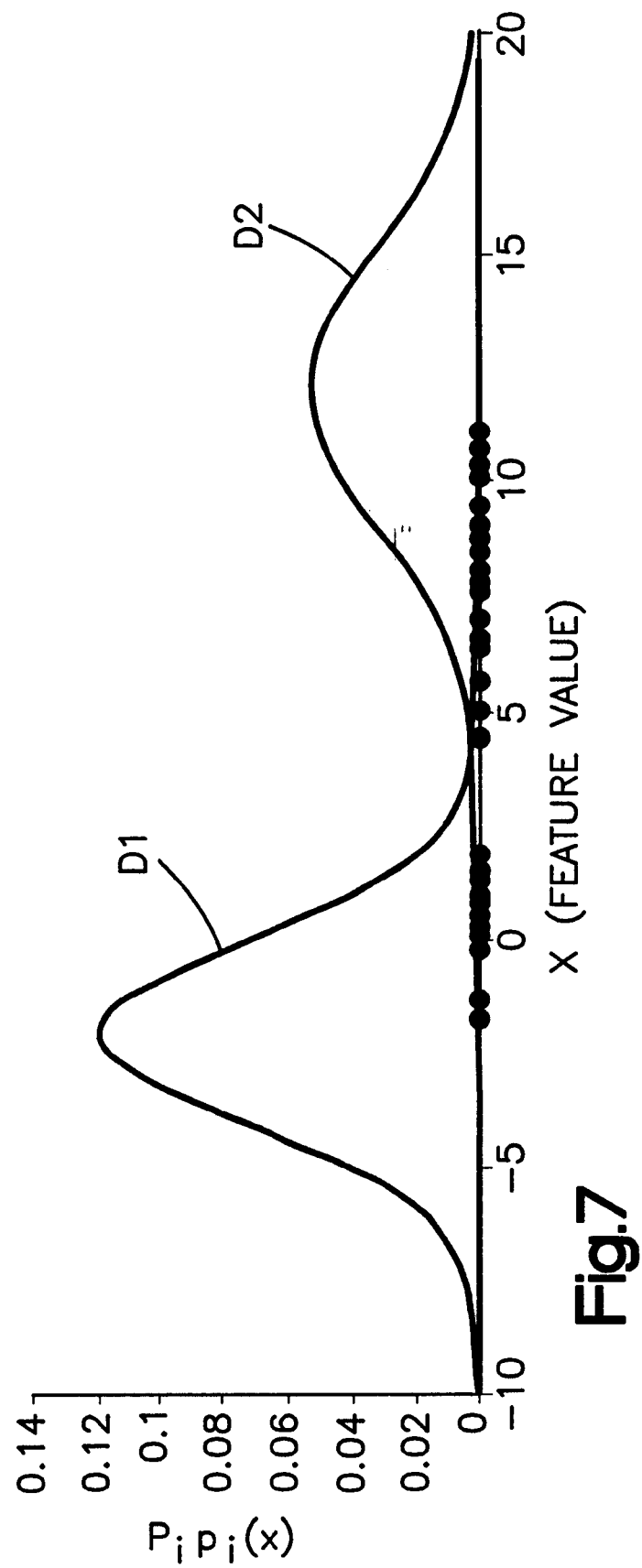
FIG. 7 is an example of a graphical representation for a statistical distribution produced according to the process of FIGS. 4A and 4B.

FIG. 7 illustrates an example of estimated mixture parameters based on a feature plane consisting of a plurality of feature values for a single feature, indicated at X, selected from the modeled temporal response of each image set. FIG. 7 shows the mixture parameters during the second time through this loop (i.e., L=2). Consequently, there are two distributions, indicated at D1 and D2. The X-axis represents the feature values (X). The Y-axis represents the value of the distribution proportion or weight $P_i$ times the probability density $p_i$ for the feature values X, namely, $P_i p_i(X)$.

From step 224, the process proceeds to step 226, in which a posterior probability $q_i$ for each distribution of the current class is determined. The posterior probability for each distribution may be expressed as:

$$q_i(x) = \frac{P_i p_i(x)}{\sum_{j=1}^{L} P_j p_j(x)} \quad \text{(Eq. 3)}$$

where:

L=the number of distributions;

$q_i$ the posterior probability for each distribution;

$P_i$=the distribution proportion;

$_i$=the distribution for which the posterior probability is being computed;

$p_i(x)$=the probability density for the $N^{th}$ distribution; and

X=the a feature value.

From step 226, the process proceeds to step 228 in which proportions $P_i$ for each distribution are determined. The new proportions $P_i$ for each distribution may be expressed as:

$$P_i = \frac{1}{N} \sum_{j=1}^{N} q_i(x_j) \quad \text{(Eq. 4)}$$

where:

N=number of samples of image sets; and i=the distribution for which the proportion is being computed.

The process then proceeds to step 230 in which the mean and covariance for each distribution are updated. The mean may be expressed as:

$$Mean_i = \frac{1}{N} \sum_{j=1}^{N} \frac{1}{P_i} x_j q_i(x_j) \quad \text{(Eq. 5)}$$

and the covariance may be expressed as:

$$Cov_i = \frac{1}{N} \sum_{j=1}^{N} \frac{1}{P_i} (x_j - Mean_i)^2 q_i(x_j) \quad \text{(Eq. 6)}$$

The $Mean_i$ is computed using the updated proportion $P_i$ values for each distribution. Similarly, the covariance $Cov_i$ is computed using the updated proportion $P_i$ and $Mean_i$ values for each distribution.

Figure 8:
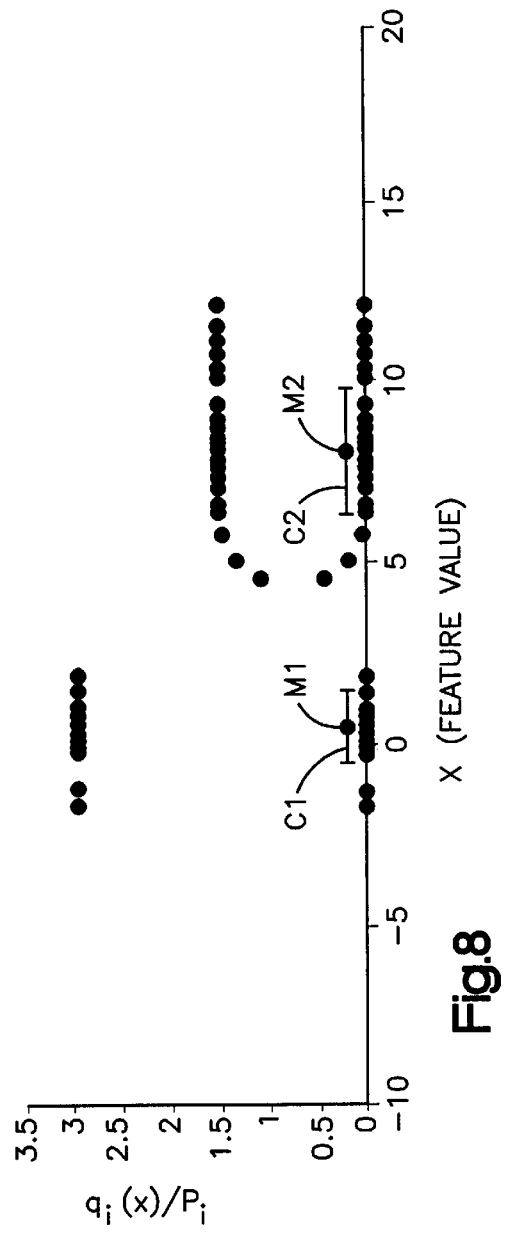
FIG. 8 is an example of a graphical representation of statistical data related to the distribution of FIG. 7.

Examples of the mean and covariance are illustrated in FIG. 8 for two distributions, similar to the situation of FIG. 7. The mean and covariance for one distribution (e.g., D1 of FIG. 7) are indicated at M1 and C1. The mean and covariance for the other distribution (e.g., D2 of FIG. 7) are indicated at M2 and C2, respectively.

Figure 9:
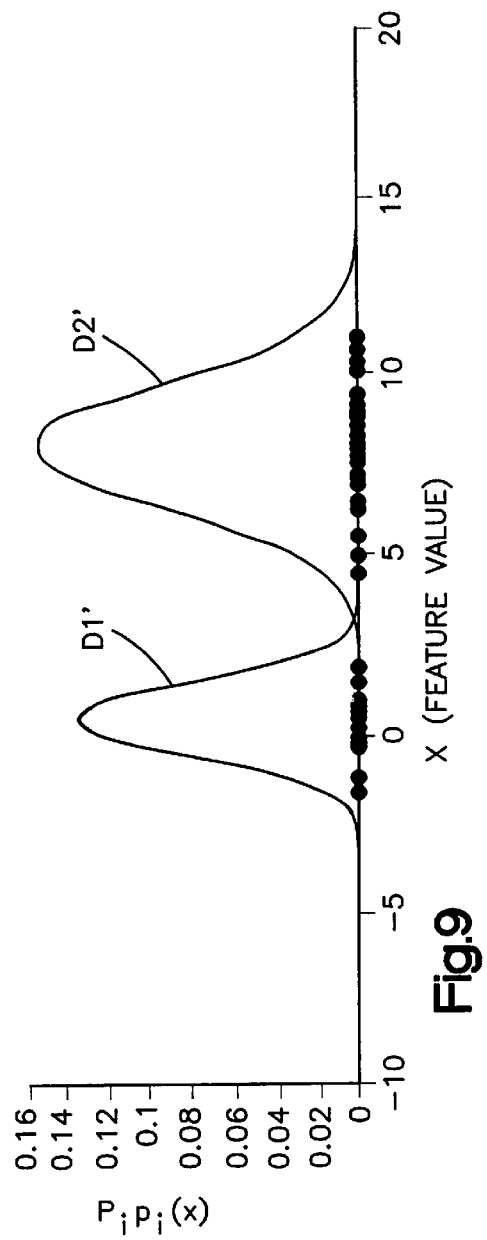
FIG. 9 is an example of a graphical representation for an updated statistical distribution produced according the process of FIGS. 4A and 4B.

From step 230, the process proceeds to step 232 in which a determination is made whether the updated distribution is a better fit than the last distribution. If this determination is affirmative, indicating that the last distribution actually provides a better fit to the values of the selected features, the process proceeds to step 234. An example of an updated version of the distributions shown in FIG. 7 is illustrated in FIG. 9. In FIG. 9, first updated distribution is indicated at D1' and the other updated distribution is indicated at D2'. At step 234, the distribution counter is incremented. The process then returns to step 224. At step 224, the mixture parameters are estimated based on the updated distribution proportions $P_i$ and posterior probabilities $q_i$.

On the other hand, if the determination at step 232 is negative, indicating that the most recently determined distribution is not a better fit than the last determined distribution, the process proceeds to step 236. The fit of the distribution model is evaluated by comparing the fitness of the last determined distribution with the fitness of current distribution. The fitness of a given model may be based on the degrees of freedom, penalty and likelihood of the distribution data. When an additional iteration with an additional distribution fails to improve the fitness of the distribution model, the process advances to step 236.

At step 236, each distribution is defined and corresponding distribution data is stored in memory.

The stored distribution data, for example, may include the feature values themselves. Alternatively or in addition to the feature values, other parameters that describe each distribution may be used, such as including the mean and covariance.

The process then proceeds to step 238 in which a determination is made whether the class counter is at its maximum value. As stated above, the class counter is used to identify to which class of tissue (e.g., malignant or benign) the statistical distribution corresponds.

In the event that the class counter is not at its maximum value, the process proceeds to step 240 in which the class counter is incremented. The process then returns to step 206 of FIG. 4A through connector B. The foregoing process (steps 206 through 236) is then repeated for the next class of image data to develop additional distributions and corresponding distribution data.

If the determination at step 238 is affirmative, indicating that distributions have been defined for each class (e.g., malignant and benign), the process proceeds to step 242. At step 242, the distribution data that have been developed from the image data are stored as a classifier. The classifier thus includes distribution data that describes predetermined feature values for each class of tissue (e.g., malignant and benign). This approach of classifying tissue may easily accommodate various subclasses of tissue conditions for each class.

The stored distribution data may be used to diagnose a condition of selected tissue of a patient having an unknown pathology, as described below. The stored distribution data further may be updated as additional image sets are acquired for tissue belonging to each respective class.

For purposes of simplification of explanation and illustration, a single feature has been described and shown with respect to FIGS. 7–9. Typically, more than one feature is used to create a distribution, in which case the distribution will be an n-dimensional distribution, where n is the number of features. In addition, while a Gaussian distribution is preferred, other types of distributions and means for describing such distributions based on the selected features may be used in accordance with the present invention.

(ii) Classifying Unknown Tissue

Figure 10:
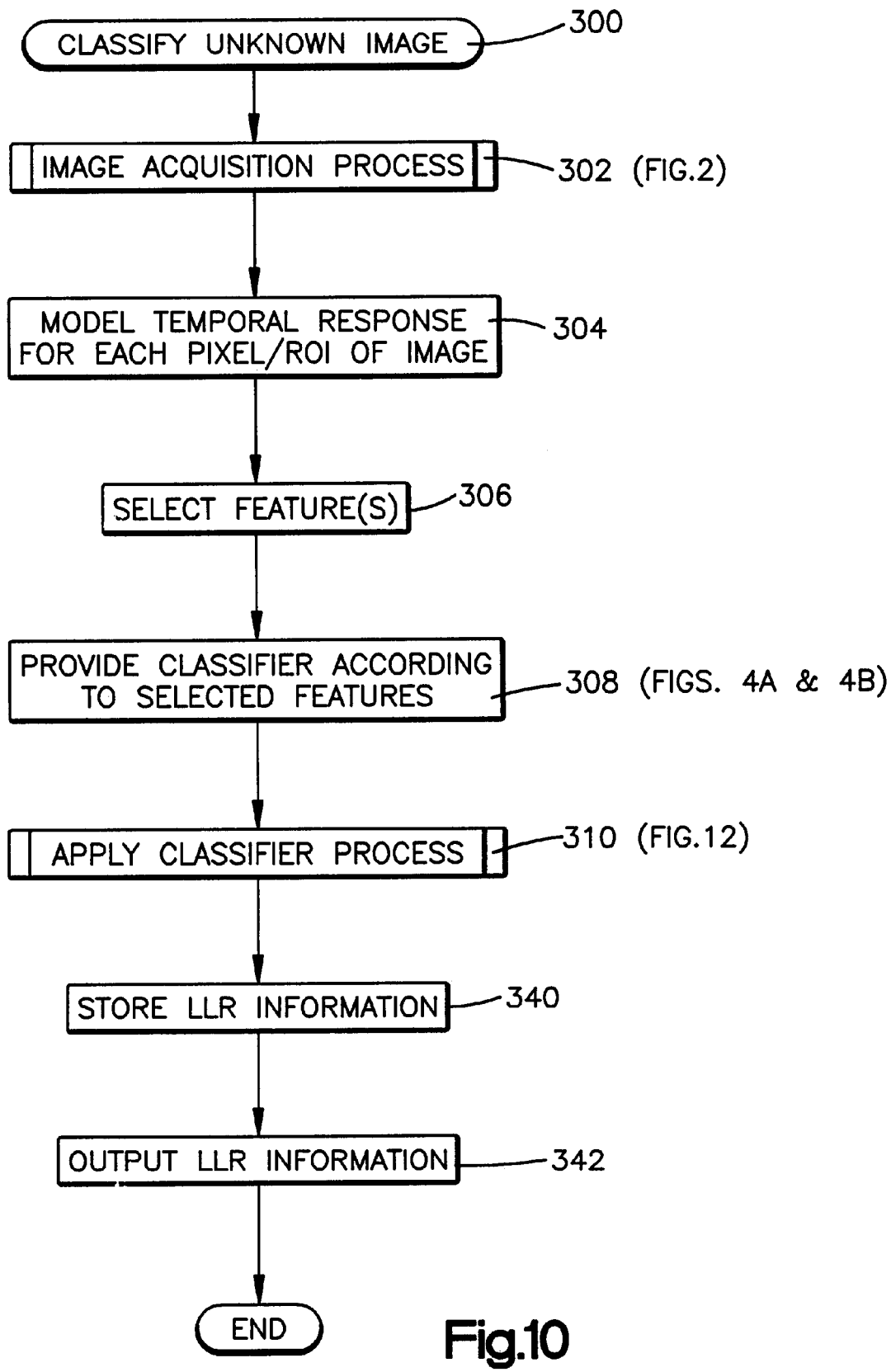
FIG. 10 is a flow diagram illustrating a process for classifying an unknown image in accordance with the present invention.

An overall process for diagnosing tissue having an unknown condition is shown in FIG. 10. As stated above, the process may be performed locally at the control circuit 18 where the images are acquired or, alternatively, at a remotely located central processing station 22.

Figure 11:
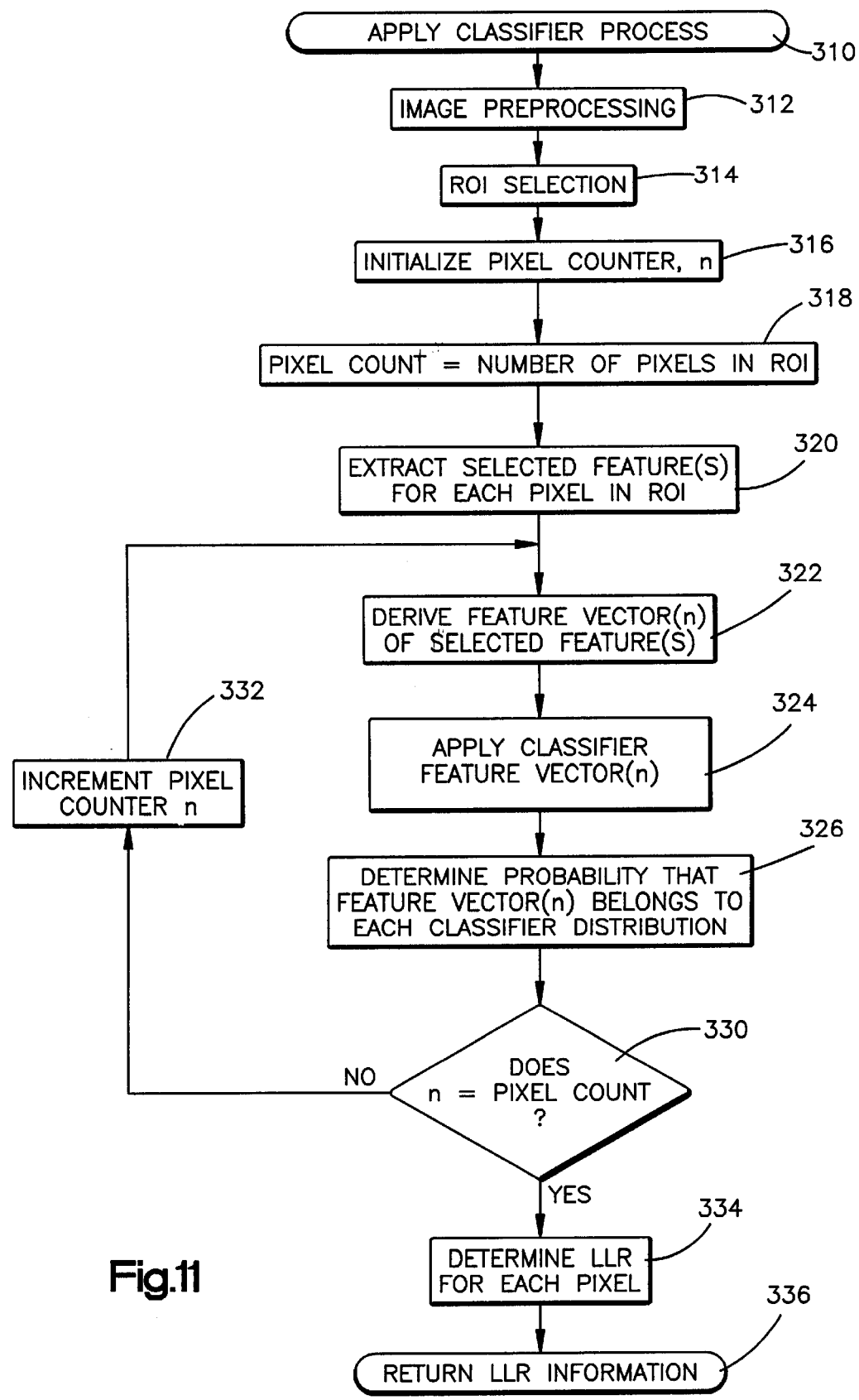
FIG. 11 is a flow diagram illustrating a process for applying a classifier, which is part of the process of FIG. 10.

The process of FIG. 11 begins at step 300 in which appropriate internal parameters are set to their initial values. The process proceeds to step 302 in which an image acquisition process is initiated. The image acquisition process is substantially identical to that shown and described with respect to FIG. 2.

In general, a plurality of thermal image frames are acquired over a time period for a selected area of the patient's tissue. Each of the image frames includes a plurality of pixels. Each pixel has a value which indicates a thermal condition of a corresponding spatial region of the tissue being imaged. The first part of the image data for each pixel corresponds to a baseline equilibrium prior to application of a thermal challenge, preferably a cooling challenge. The remaining image data corresponds to the thermal characteristics of the tissue during application of the thermal challenge. The acquired image data for the selected tissue of the patient is stored and the process proceeds to step 304.

At step 304, a temporal response for each pixel or a region of interest of the image is modeled. The modeling is substantially identical to that described above with respect to step 214 of FIG. 4A. The modeling includes fitting the temporal response of each pixel to one or more predetermined models (e.g., see Equations 1 and 2 above). A temporal response may be determined for each pixel in the image set and/or for one or more pixels within a selected region of the image set. The same model or models should be used to quantify the patient's image data as were used to model the image data that was used to form a desired classifier.

The process next proceeds to step 306 in which at least one and preferably a plurality of features are selected. Each of the selected features has a value indicative of a thermal characteristic of a part of the patient's tissue over the image acquisition time period. In particular, the features selected at step 306 are identical to the features used to develop the classifier, although the feature values may differ.

The process proceeds to step 308 in which a classifier is provided. The classifier is developed according to the process previously described with respect to FIGS. 4A and 4B. The classifier includes one or more n-dimensional statistical distributions, where n is the number of selected features at step 306. The statistical distributions describe a plurality of predetermined feature values based on numerous samples of image data. The classifier distributions are determined from previously diagnosed tissue belonging to a class having a known tissue condition (e.g., malignant or benign). The features selected at step 306 should be the same as the features used to develop the classifier. From step 308, the process proceeds to step 310 in which the classifier is applied to the selected features determined from the acquired image. A process for applying the classifier to the selected features is shown in FIG. 11.

(iii) Process of Applying Features

In FIG. 11, the application of features process begins at step 310 in which parameters are set to their initial values and flag conditions are reset. The process proceeds to step 312 in which image pre-processing of the acquired image data is performed. Such pre-processing may include, for example, temporal and spatial filtering of the acquired image data.

The process then proceeds to step 314 in which an appropriate region of interest (ROI) of the patient's tissue is selected. As stated above with respect to the classifier development process (FIGS. 4A–4B), the ROI is selected based on a histological examination of the tissue being imaged using other diagnostic modalities, such as mammogram, ultrasound, physical examination, etc. The ROI may be further refined by the control circuit 18, such as based on detected temperature gradients in the image data.

The process proceeds to step 316 in which a pixel counter, indicated at n, is initialized. The pixel counter indicates which pixel in the selected ROI is being processed at a given time. At step 318, a maximum pixel count value is set equal to the number of pixels in the selected ROI. It will be appreciated that rather than analyzing an individual pixel, an average or mean value of a group of pixels corresponding to a subregion of the patient's tissue may be used.

From step 318, the process proceeds to step 320. At step 320, selected features are extracted from the modeled temporal response for each pixel in the ROI. The process then proceeds to step 322 in which a feature vector is derived for each pixel in the ROI. A feature vector is a set of feature values for a pixel that describes the temperature response at a corresponding spatial region of the patient's tissue. The feature vector also characterizes the temperature response over at least part of the image acquisition time period according to which features are selected (e.g., at step 306 of FIG. 10). Accordingly, different features may be selected to quantify different attributes of the temperature response for each pixel in the ROI.

The process then proceeds to step 324 in which the classifier is applied to the feature vector for the current pixel. The classifier includes predetermined distribution data for the selected features. Such distribution data includes, for example, parameters that describe n-dimensional distributions for each class of tissue (e.g., malignant, benign), where n is the number of selected features. The distribution data also could include the predetermined feature values that were used to derive the distributions for each class. The process then proceeds to step 326 in which a likelihood is determined whether the feature vector for the current pixel belongs to each distribution of the classifier. This determination will vary depending upon the type of distribution being used and the number of distributions in the classifier. For example, when the classifier distributions are n-dimensional Gaussian distributions, the likelihood may be a likelihood value that describes a likelihood that the feature vector fits within each such n-dimensional distribution.

From step 326, the process proceeds to step 330. At step 330, a determination is made is whether the pixel counter is equal to the number of pixels in the selected region of interest. If the determination is negative, the process proceeds to step 332 in which the pixel counter incremented.

The process then returns to step 322 in which a feature vector is determined for the next pixel in the ROI based on the selected features (step 322). Likelihood values then are determined for each distribution of the classifier (steps 324–326).

In the event that the determination at step 330 is affirmative, the process proceeds to step 334. This occurs after each of the pixels in the selected region of interest has been applied to the classifier distributions and corresponding likelihood values have been determined. Each pixel in the ROI is provided with likelihood values indicating the likelihood that the associated spatial region of the tissue belongs to a particular class of tissue (e.g., malignant or benign). The likelihood values for each class are derived from the likelihood values determined for each distribution in each corresponding class of tissue.

In a preferred embodiment, a Bayesian classifier is used to determine the likelihood that the patient's tissue is malignant. A Bayes likelihood ratio test may be expressed in terms of a log likelihood ratio (LLR). At step 334, the LLR is determined for each pixel based on the likelihood values determined for each class of tissue. The LLR is the natural logarithm of a ratio of the likelihood that a selected spatial region of tissue belongs to one class of tissue to the likelihood that the selected spatial region belongs to another class. For our example of two classes having tissue conditions malignant and benign, the LLR may be expressed as:

$$LLR = \ln\left(\frac{Pmalignant(f)}{Pbenign(f)}\right) \quad \text{(Eq. 7)}$$

where f is the vector of feature values selected from the cooling response models. Each LLR value provides a likelihood value which indicates objective criteria of whether the spatial region associated with each pixel is malignant or benign. A higher LLR value indicates a greater likelihood of malignancy, and a lower LLR value indicates a greater likelihood of benignancy.

After an LLR value has been determined for each pixel, the process proceeds to step 336 in which the determined LLR information is returned to the main classification process of FIG. 11. Referring back to FIG. 11, the process continues at step 340 in which the stored LLR information is stored in an appropriate format. The process then proceeds to step 342 in which the LLR information is provided as output.

The set of LLR values provided as output indicates the condition of the patient's tissue that was imaged. The results of the analysis may be provided to a suitable output device (e.g., 56, 57 of FIG. 1). The output device may be a display, which displays the LLR information for evaluation by a radiologist or other clinician. The data preferably provides a pixel-by-pixel visual representation based on the likelihood values. The set of LLR values may, for example, be represented by an image of the patient's tissue with different colors or a gray scale being used to indicate the likelihood of malignancy based on the LLR values.

Where the computational analysis is performed at a central station, the determined LLR values also may be provided to a radiologist or other clinician. The results also may be stored to a suitable memory device for subsequent analysis, such as to non-volatile memory, or made available for retrieval over an associated network. The results of the classification process of FIG. 10 advantageously help the radiologist or other physician differentiate between malignant and benign lesions, thereby reducing the number of unnecessary biopsies.

In view of the foregoing description, the system and method, in accordance with the present invention, help a practitioner to discriminate between malignant and benign lesions. This is based on physiological components of the patient's breast, as detected by digital thermal imaging. The system and method of the present invention further provide a useful adjunct to ultrasound, mammography, and other modalities for diagnosing breast carcinomas.

It is also contemplated that a classifier may be developed to accommodate numerous classes or subclasses of tissue. In this way, for example, a particular type of carcinoma may, in accordance with the present invention, be diagnosed based on the thermal image profile for selected tissue of a patient.

While a preferred embodiment has been described with respect to a patient's breast, the system and method of the present invention also contemplates helping diagnose the condition of other body parts. Additionally, various types of tissue conditions (other than cancer) may be diagnosed, in accordance with the present invention, upon developing a suitable classifier.

From the above description of the invention, those skilled in the art will perceive improvements, changes and modifications. Such improvements, changes and modifications within the skill of the art are intended to be covered by the appended claims.

Having described the invention, the following is claimed:

1. A system for helping to determine a condition of selected tissue of a patient, said system comprising:

memory storing a plurality of images of the selected tissue acquired over a time period to define an image set, each of said images of said image set including a plurality of image regions, each of said image regions having a characteristic that is variable over the time period indicative of a temperature condition of an associated part of the selected tissue, said memory also storing a statistical classifier that describes temperature characteristics of previously diagnosed tissue samples having a known tissue condition; and a processor connected with said memory, said processor being operative to determine at least one feature value for at least one of said image regions, said at least one feature value being indicative of at least part of the characteristic of said at least one image region over the time period, said processor being operative to apply said statistical classifier to said at least one feature value to provide an indication of the condition of the part of the selected tissue of the patient associated with said at least one image region.

2. A system as set forth in claim 1 wherein said classifier describes a statistical distribution of a plurality of predetermined feature values, said predetermined feature values being derived from image sets of previously diagnosed tissue having a known tissue condition, said processor applying said classifier to said at least one feature value to determine a value for the part of the selected tissue associated with said at least one image region indicating a likelihood that the part of the selected tissue associated with said at least one image region belongs to a class of tissue described by said classifier.

3. A system as set forth in claim 2 wherein said classifier has a first part describing a distribution of predetermined feature values derived from previously diagnosed tissue having a first tissue condition, said classifier having a second part describing another distribution of predetermined feature values derived from previously diagnosed tissue having a second tissue condition which is different from the first tissue condition, said processor determining (i) a likelihood that the part of the selected tissue associated with said at least one image region has the first tissue condition and (ii) a likelihood that the part of the selected tissue associated with said at least one image region has the second tissue condition.

4. A system as set forth in claim 3 wherein the first tissue condition is malignant and the second tissue condition is benign, said processor applying said classifier to said at least one feature to indicate a likelihood that the part of the selected tissue associated with said at least one image region is malignant and a likelihood that the part of the selected tissue associated with said at least one image region is benign.

5. A system as set forth in claim 1 wherein said processor determines a plurality of features for each of said image regions, each of said plurality of features having a value indicative of the characteristic of an associated one of said image regions, said processor applying said classifier to said plurality of features for at said at least some of said image regions to provide a likelihood value for said at least some of said image regions, each of the likelihood values indicating a likelihood that the part of the selected tissue associated with each of said at least some of said image regions has the known tissue condition.

6. A system as set forth in claim 5 wherein said processor is programmed to quantify the characteristic of each of said at least some of said image regions by fitting each corresponding characteristic to a predetermined curve, each of said plurality of features for each of said at least some of said image regions having a value indicative of a parameter of the predetermined curve quantifying the corresponding characteristic.

7. A system as set forth in claim 1 wherein said image set is a plurality of thermal images of the selected tissue of the patient and the characteristic of each of said image regions is a temperature profile for the part of the selected tissue associated with each of the image regions over the time period.

8. A system as set forth in claim 7 wherein at least a substantial number of said plurality of thermal images are acquired during application of a thermal challenge to the selected tissue of the patient, the characteristic of each of said image regions varying based on the temperature condition of the part of the selected tissue associated with said image region in response to the thermal challenge.

9. A system as set forth in claim 8 wherein the thermal challenge is a cooling challenge, the characteristic of each of said image regions representing a cooling response of the part of the selected tissue associated with a respective said image region.

10. A system as set forth in claim 9 wherein said processor is programmed to quantify the characteristic of each of said image regions by fitting the characteristic of each of said image regions to a predetermined model, said processor determining at least one feature value for each of said image regions indicative of a parameter of the corresponding predetermined model.

11. A system as set forth in claim 10 wherein at least part of the predetermined model for each of said image regions varies exponentially as a function of temperature of the associated part of the selected tissue over the time period.

12. A system as set forth in claim 11 wherein at least part of the predetermined model is:

$$T = T_0 + T_1(1 - e^{\alpha_1 t}) + T_2(1 - e^{\alpha_2 t})$$

where:

$T_0$ = initial temperature data before initiation of thermal challenge(° C.);

$T_1$ = magnitude of cooling due to a first mechanism during application of thermal challenge(° C.);

$\alpha_1$ = rate of cooling due to the first mechanism during application of thermal challenge (1/seconds);

t = time;

$T_2$ = magnitude of cooling due to a second mechanism during application of thermal challenge (° C.); and $\alpha_2$ = rate of cooling due to the second mechanism during application of thermal challenge (1/seconds)

and said at least one feature is selected from a group consisting of T, $T_0$, $T_1$, $T_2$, $\alpha_1$, $\alpha_2$, and combinations thereof.

13. A system for helping to determine a condition of selected tissue of a patient, said system comprising:

memory storing a plurality of thermal images of the selected tissue of the patient obtained over an image acquisition time period, the selected tissue having been exposed to a cooling challenge during a substantial part of the image acquisition time period, each of said thermal images including a plurality of image regions corresponding to an associated part of the selected tissue, each of said image regions having a characteristic that is variable over the image acquisition time period indicative of a temperature condition of the associated part of the selected tissue; and a processor connected with said memory, said processor being operative to determine at least one feature for at least one of said image regions over the image acquisition time period, said at least one feature having a value indicative of the characteristic of said at least one image region over the image acquisition time period, said processor providing an indication of the condition of the part of the selected tissue associated with said at least one image region upon applying a statistical classifier to the value of said at least one feature, said statistical classifier describing a statistical distribution of a plurality of predetermined feature values derived from thermal images of previously diagnosed tissue having a known tissue condition.

14. A method for helping determine a condition of selected tissue of a patient, said method comprising the steps of:

acquiring an image set of the selected tissue over an image acquisition time period, the image set including a plurality of image regions, each image region having a characteristic that is variable over the image acquisition time period and indicative of a temperature condition of an associated part of the selected tissue;

applying a thermal challenge to the selected tissue during a substantial part of the image acquisition time period;

modeling the characteristic of at least one image region to quantify a plurality of features for each characteristic being modeled, each feature having a value functionally related to the characteristic being modeled;

selecting at least one feature for the at least one image region; and applying a statistical classifier to each of the selected at least one feature to provide an indication of the condition of the part of the selected tissue associated with the at least one image region, the statistical classifier describing a plurality of predetermined feature values derived from image sets of previously diagnosed tissue having a predetermined tissue condition.

15. A method as set forth in claim 14 wherein said thermal challenge is a cooling challenge.

16. A method as set forth in claim 14 wherein said step of modeling further includes fitting at least part of the characteristic of the at least one image region to a predetermined model defined by an equation that varies exponentially as a function of temperature for the associated part of the selected tissue over the time period, the features for each characteristic being selected from the predetermined model.

17. A method as set forth in claim 16 wherein at least part of the predetermined model is:

$$T=T_0+T_1(1-e^{\alpha_1 t})+T_2(1-e^{\alpha_2 t})$$

where:
$T_0$=initial temperature data before initiation of thermal challenge(° C.);
$T_1$=magnitude of cooling due to a first mechanism during application of thermal challenge(° C.);
$\alpha_1$=rate of cooling due to the first mechanism during application of thermal challenge (1/seconds);
t=time;
$T_2$=magnitude of cooling due to a second mechanism during application of thermal challenge (° C.); and
$\alpha_2$=rate of cooling due to the second mechanism during application of thermal challenge (1/seconds)

and said at least one feature is selected from a group consisting of T, $T_0$, $T_1$, $T_2$, $\alpha_1$, $\alpha_2$, and combinations thereof.

18. A method as set forth in claim 14 wherein each of the image regions is at least one image pixel.

19. A method as set forth in claim 14 wherein said step of applying each of the selected at least one feature to the classifier further includes determining a likelihood that the part of the selected tissue associated with the at least one image region has the known tissue condition.

20. A method as set forth in claim 19 wherein a first part of the classifier describes a distribution of predetermined feature values derived from thermal image sets of previously diagnosed tissue having a first tissue condition, a second part of the classifier describes another distribution of predetermined feature values derived from thermal image sets of previously diagnosed tissue having a second tissue condition which is different from the first tissue condition, said method further including determining (i) a likelihood that the part of the selected region of tissue associated with the at least one image region has the first tissue condition and (ii) a likelihood that the part of the selected region of tissue associated with the at least one image region has the second tissue condition.

21. A method as set forth in claim 20 wherein the first tissue condition is malignant and the second tissue condition is benign.

22. A method of developing image data for use in helping determine a condition of selected tissue of a patient, said method comprising the steps of:
providing thermal image data for a plurality of image sets, each of the plurality of image sets being obtained over an image acquisition time period for a different selected tissue sample;
selecting an image region for each of the plurality of image sets corresponding to part of each selected tissue sample having a predetermined tissue condition, each selected image region having a characteristic that is variable over the image acquisition time period indicative of a temperature condition for the part of the selected tissue sample of the corresponding image set;
determining a plurality of features for each selected image region, each feature having a value indicative of the characteristic of a respective one of the selected image regions;
selecting at least one feature for each selected image region having a common predetermined tissue condition; and
developing a statistical classifier that describes a statistical distribution based on the values of each selected at least one feature, the statistical distribution being indicative of temperature characteristic for tissue having the common predetermined tissue condition.

23. A method as set forth in claim 22 wherein said step of determining further includes modeling the characteristic for each selected image region over the image acquisition time period to fit a predetermined model, each modeled characteristic defining at least some of the plurality of features for each selected image region based on corresponding parameters of the predetermined model.

24. A method as set forth in claim 23 wherein the predetermined model is:

$$T=T_0+T_1(1-e^{\alpha_1 t})+T_2(1-e^{\alpha_2 t})$$

where:
$T_0$=initial temperature data before initiation of thermal challenge(° C.);
$T_1$=magnitude of cooling due to a first mechanism during application of thermal challenge(° C.);
$\alpha_1$=rate of cooling due to the first mechanism during application of thermal challenge (1/seconds);
t=time;
$T_2$=magnitude of cooling due to a second mechanism during application of thermal challenge (° C.); and
$\alpha_2$=rate of cooling due to the second mechanism during application of thermal challenge (1/seconds)

and at least some of said features for each image region are selected from a group consisting of T, $T_0$, $T_1$, $T_2$, $\alpha_1$, $\alpha_2$, and combinations thereof.

25. A method as set forth in claim 23 wherein a thermal challenge is applied to each selected tissue sample during a substantial part of the image acquisition time period for each of the plurality of image sets, the features for each selected image region indicating changes in the temperature condition of the part of the selected tissue sample associated with each selected image region in response to the thermal challenge.

26. A method as set forth in claim 25 wherein the statistical distribution is a first statistical distribution for a class having a first predetermined tissue condition, said method further including the steps of:
selecting a second image region for each of another plurality of image sets corresponding to part of each selected tissue sample having a second predetermined tissue condition, each selected second image region having a characteristic that is variable over the image acquisition time period indicative of a temperature condition for the part of the selected tissue sample of the corresponding image set;
determining a plurality of features for each selected second image region, each feature having a value indicative of a respective one of the selected second image regions; and
developing the classifier based on the first statistical distribution and a second statistical distribution, the second statistical distribution being based on at least one feature selected for each of the selected second image regions having the second predetermined tissue condition.

27. A method as set forth in claim 26 wherein the first predetermined tissue condition is malignant and the second predetermined tissue condition is benign.

28. A method as set forth in claim 26 wherein each of the plurality of image sets includes a plurality of image frames, each selected image region further including a plurality of image subregions in each image frame, each of the plurality of image subregions in each image set having a value indicative of a thermal condition for an associated spatial region of the selected tissue sample that is variable over the image acquisition time period.

29. A method as set forth in claim 28 wherein the thermal characteristic of each of the plurality of image subregions is modeled to fit an equation that varies exponentially as a function of temperature for the associated spatial region of each respective the selected tissue sample over at least part of the corresponding image acquisition time period.

30. A method as set forth in claim 28 further including determining an average value of the thermal characteristic for each of the image subregions of a selected image region in each image frame and modeling a temporal response for each selected region of each image set using the determined average values, each temporal response indicating an average temperature condition for an associated spatial region of the respective selected tissue sample in each frame of the corresponding image acquisition time period, the plurality of features for each selected image region being determined based on the temporal response modeled for each respective selected image region.

31. A method as set forth in claim 30 wherein each subregion is at least one pixel.

32. A system for helping determine a condition of selected tissue of a patient, said system comprising:

means for obtaining an image set of the selected tissue over an image acquisition time period, the image set including a plurality of image regions, each image region having a characteristic that is variable over the image acquisition time period and indicative of a temperature condition of an associated part of the selected tissue;

means for applying a thermal challenge to the selected tissue during a substantial part of the image acquisition time period;

means for modeling the characteristic of at least one image region to quantify a plurality of features for each characteristic being modeled, each feature having a value functionally related to the characteristic being modeled;

means for selecting at least one feature for the at least one image region; and means for applying a statistical classifier to each of the selected at least one feature to provide an indication of the condition of the part of the selected tissue associated with the at least one image region, the statistical classifier describing a plurality of predetermined feature values derived from image sets of previously diagnosed tissue having a predetermined tissue condition.

* * * * *